March 12, 1968  W. B. REID ET AL  3,372,462

METHOD OF MAKING PLASTIC LINED METAL PIPE

Filed Oct. 11, 1965

INVENTORS
WILLIAM BRADLEY REID
WALTER ROBERT GRAHAM
BY
Woodhams, Blanchard & Flynn
ATTORNEYS

United States Patent Office 3,372,462
Patented Mar. 12, 1968

3,372,462
METHOD OF MAKING PLASTIC LINED
METAL PIPE
William Bradley Reid, Kalamazoo Township, Kalamazoo
County, and Walter Robert Graham, Kalamazoo, Mich.,
assignors to The Upjohn Company, Kalamazoo, Mich.,
a corporation of Delaware
Filed Oct. 11, 1965, Ser. No. 494,523
4 Claims. (Cl. 29—447)

This invention relates to a process for making plastic-lined metal tubing and, more particularly, relates to a process for lining an aluminum tube with a relatively thick-walled, substantially rigid polyvinyl chloride lining.

For illustrative purposes, the following description will proceed primarily with reference to the formation of a composite tube product comprising aluminum tubing lined with a relatively thick-walled, substantially rigid polyvinyl chloride lining and intended for use as a conduit for supplying water to laboratory animals. It will be understood, however, that the invention is not limited to the above-named specific materials and, further, that the product is capable of many different uses.

There has been devised an improved system for supplying water to large numbers of animals in individual cages. In this system, water, which may have other materials, such as vitamins, dissolved in it, is supplied to a manifold pipe. Individual, animal-actuated valve units are secured to the manifold pipe at spaced points therealong and each valve unit projects into an animal cage so that the animal therein can actuate the valve in order to obtain water. Since this system is used for carrying out pharmaceutical and medical experiments, the parts of the watering system, including the manifold pipe, must be capable of being sterilized. Moreover, new experiments may require different physical arrangements so that the equipment forming the system should be adaptable to change for this purpose.

Referring now particularly to the manifold conduit, while this conduit can be made solely of metal, such as aluminum or copper tubing, the system as a whole requires the use of a large number of fittings and the installation thereof on metal pipe is time consuming and expensive. Further, sterilization of such a system is relatively difficult to carry out and the system is rather inflexible so that changes in the physical arrangement of the watering system are difficult to effect. While plain plastic tubing may be more convenient to install, it loses its strength and shape when heated for sterilization purposes which makes it unacceptable for the purposes of the present invention. Even with the higher melting point plastics, while physical destruction of the tube may not take place when it is heated for sterilization purposes, nevertheless, the tube may sag or otherwise change its shape which is undesirable. Accordingly, a need exists for a conduit which is shape-retaining when heated to sterilization temperatures, which can be provided with a large number of valves or other fittings easily and conveniently and which can be modified readily to adapt it to different physical arrangements.

It has been suggested heretofore to line metal tubes with a plastic lining for corrosion resistance or other purposes. A common procedure for doing this involves inserting into the metal tube a relatively thin-walled plastic tube having an outside diameter slightly smaller than the inside diameter of the metal tube and then expanding the plastic tube into snug engagement with the metal tube by heating and applying an internal pressure, usually a fluid pressure, to the plastic tube. This procedure is not completely satisfactory because in use the plastic tube tends to shrink away from the metal tube so that the adhesion therebetween is destroyed and the plastic tube becomes loose. In some instances, the inside of the metal tube is coated with an adhesive for bonding purposes but this increases the cost and difficulty of carrying out the procedure. Moreover, the adhesive may deteriorate in time so that the plastic tube becomes loose. Other known procedures involve reducing the diameter of the metal tube after it is lined by drawing it through reducing dies but this stretches the tube product and there is a residual axial stress in the plastic tube which can lead to premature failure thereof.

The foregoing procedures involve the use of a relatively thin-walled plastic tube. However, it is desirable to provide a relatively thick-walled plastic lining inside of a metal tube. Such a construction makes it possible to provide a composite tube product in which any fittings, valves, etc., can be attached primarily to the plastic lining, as by use of a suitable adhesive or the like, while the outer metal tube can be quite thin-walled because it serves essentially only to prevent deformation of the plastic tube when the composite tube product is heated, as for sterilization purposes. In this way, the necessity for threading the metal tube is obviated and, also, it is not necessary to use a pipe joint compound. Changes in the physical arrangement of the pipe and associated fittings are relatively easy to carry out simply by removing the fittings from the holes in which they were placed, plugging these holes by a suitable plastic plug, drilling new holes, if necessary, at the desired locations and then placing the fittings into the new holes. Such a technique could not be carried out with the relatively thin-walled plastic linings heretofore used and such required threading of the metal tube which is undesirable for the reasons discussed above.

Accordingly, the objects of the invention include the following:

(1) To provide an improved process for manufacturing a composite tube product comprising an outer metal tube and an inner plastic tube whose opposing surfaces are in snug engagement, with no appreciable gaps therebetween, so that the plastic tube cannot slide axially within the metal tube.

(2) To provide an improved process, as aforesaid, in which the inner plastic tube has a relatively large wall thickness so that cooperating parts, such as fittings or valves, can be attached directly to the plastic tube, as by a suitable adhesive, and these parts need not be affixed to the metal tube.

(3) To provide an improved process, as aforesaid, in which the plastic tube, while in a shrunken condition, is placed inside of the metal tube so that when the plastic tube tends to return to its original condition, it expands into snug engagement with the internal wall of the metal tube and such expansion does not require the use of pressure fluid for expansion purposes.

(4) To provide an improved process, as aforesaid, in which the metal tube has its inside diameter reduced when the plastic tube, in a shrunken condition, is disposed therewithin in order to insure a snug contact therebetween when the plastic tube is returned to its original condition.

(5) To provide an improved process, as aforesaid, in which the step of reducing the inside diameter of the metal tube does not involve steps which would lead to the creation of an axial stress of the plastic tube.

It has been discovered, unexpectedly in view of the prior art, that certain types of plastic tubes will undergo a reduction in their outside diameter when they are heated. While a general property of plastic materials is that they will expand when heated, extruded substantially rigid polyvinyl chloride and tubes of other plastic materials having substantially the same properties as rigid polyvinyl chloride extruded tubes do in fact shrink when heated and such tubes can be used for the purposes of the present invention.

Tubes formed by extrusion have residual internal stresses therein. When the tubes are heated to a temperature below the annealing temperature for the particular material involved, these stresses are relieved and in so doing the plastic material undergoes some shrinkage. This property has been observed with rigid polyvinyl chloride extruded tubes and it is believed that other plastic materials have similar properties.

Because of the foregoing discovery, a composite tubular product capable of meeting the objects set forth above, and others related thereto, can be formed by, first, heating an elongated plastic tube having the characteristics referred to above and thereby reducing the external diameter thereof; second, placing the heated tube inside of a metal tube so that it fits somewhat loosely therewithin; third, while the plastic tube is still heated reducing the inside diameter of the metal tube so that it makes snug contact with the external wall of the plastic tube; and, fourth, then cooling the assembly which causes the plastic tube to expand somewhat so that its external wall tightly engages the internal wall of the metal tube so that there are no appreciable gaps therebetween, whereby the plastic tube is affixed to, and cannot move axially within, the metal tube.

It is not fully understood why the plastic tube of the type referred to above contracts upon heating, which is contrary to a general property of materials, namely, that they expand when heated. However, it has been hypothesized that there are residual stresses and strains in the plastic tube as a result of the operation of molding same, which ordinarily is an extrusion process, where tubing is concerned, and that when the plastic tube is heated the stresses are relieved and in so doing the plastic material shrinks. It has also been suggested that some unexplained chemical reaction may occur and cause this shrinkage, either alone or in conjunction with the stress relieving. Moreover, the material comprising the tubing has been compressed during manufacture thereof and perhaps by heating the plastic tubing, this compression is relieved, thereby causing expansion of the tubing. However, it is to be understood that the invention is not limited to the correctness of the foregoing suggestions. Regardless of the accuracy of the foregoing suggestions, such shrinkage does occur and advantage is taken of this discovery in order to carry out the process of the invention.

The reduction of the inside diameter of the metal tube preferably is carried out by stretching the metal tube using any convenient kind of stretching machine. Such machines usually comprise a set of jaws mounted on a fixed support and adapted for gripping one end of the metal tube. A second set of jaws is provided for engaging the other end of the metal tube and said second set of jaws is mounted for movement in a direction lengthwise of the tube, as by a hydraulic cylinder. The tube is placed between and is engaged by the jaws and then the jaws are moved apart to stretch the tube and thereby reduce its inside and outside diameter. The metal is stretched beyond its yield point and therefore takes a permanent set so that its internal wall snugly contacts the external wall of the plastic tube. However, the metal is not stretched to a point where its tensile strength is exceeded so that the metal tube at all times is maintained in an unbroken and uncracked condition.

Although stretching of the metal tube to reduce its diameter is preferred for the purposes of the invention, at least some of the broader objects of the invention can be met by using other techniques for this purpose. For example, the diameter of the metal tube can be reduced by moving it through a reducing die or by rolling down the tube.

The plastic tube preferably is relatively thick-walled, i.e., the wall thickness is in excess of about 3/8 inch. The original external diameter of the plastic tube can be varied somewhat depending upon the amount of shrinkage of the plastic tube that occurs upon heating thereof. The plastic tube should be in a self-sustaining condition when heated so that it does not sag when inserted into the plastic tube. If desired, however, the plastic tube could be supported on a mandrel when it is inserted into the plastic tube. Therefore, the critical feature of the invention is that the plastic tube, when heated, undergoes a reduction of its external diameter so that it can fit somewhat loosely inside the metal tube. Thus, it is possible to easily slide even very long lengths of the plastic tube into a correspondingly long metal tube, even though the external surface of the plastic tube may be somewhat sticky. However, the external diameter of the plastic tube, when heated, should not be so small that there is a greater clearance between it and the metal tube than can be taken up by reducing the internal diameter of the metal tube as above described, because when the diameter of the metal tube has been reduced, the internal wall of the metal tube should be in contact with the external wall of the plastic tube.

It has been found that a tube made of an aluminum alloy (6063T4 or 6063T5) and having an external diameter of 0.98 inch and an internal diameter of 0.86 inch can be stretched to reduce its internal diameter to about 0.844 inch (a diameter reduction of about 0.016 inch) without fracturing or cracking. Relatively thin-walled tubes, that is, tubes having a wall thickness of less than about 0.25 inch, made of other ductile metals, such as low-carbon steel, copper, etc., have similar properties and can be used for the purposes of the invention. It is generally considered that the amount of stretching of the metal tube should not exceed about 2% of its length, although this is subject to some variation depending upon the properties of the particular metal involved.

Referring to the specific aluminum alloy tube mentioned immediately above, the plastic tube should be heated so that when it is inserted into the metal tube and before the diameter of the metal tube is reduced, the maximum radial clearance between the two tubes should not exceed about 0.008 inch (a diameter difference of about 0.016 inch). That is, the external diameter of the heated plastic tube should not be less than about 0.844 inch where the metal tube has an internal diameter of 0.86 inch so that when the diameter of the metal tube is reduced, it will snugly engage the external wall of the plastic tube.

Especially satisfactory results have been achieved using a plastic tube composed of rigid polyvinyl chloride (schedule 120, type 1, grade 1, conforms to ASTM Standard 1784). This material has excellent resistance to chemicals and excellent physical properties which are desired for the purposes of the invention. The initial diameter of the polyvinyl chloride tube used in conjunction with the aluminum tube referred to above was such that there was a fairly snug, but sliding, fit between the two tubes. For example, the external diameter of the plastic tube was about 0.859 inch. When the polyvinyl chloride tubing was heated to from about 180–200° F., the external diameter of the tube reduced to about 0.850 inch so that it could be easily slid lengthwise into the aluminum tube. Thus, there was a radial clearance of about 0.005 inch between the two tubes and the diameter of the aluminum tube could be reduced, as above described, to bring the internal wall of the metal tube into snug engagement with the external wall of the plastic tube, all of which could be carried out without exceeding the tensile strength of the aluminum tube.

Although rigid polyvinyl chloride tubing is preferred for the purposes of the invention, tubing of other plastic materials having the above-named characteristics, such as high-density polyethylene, nylon, polytetrafluoroethylene, etc., also can be used. The temperature to which the plastic tubing is heated in order to reduce its diameter can be adjusted as needed in order to insure the desired operation as described above.

After the diameter of the metal tube is reduced, the composite tube product is cooled and the plastic tubing expands somewhat in order to more tightly contact and bear firmly against the metal tube so that the plastic tube is affixed to and is held against axial movement within the metal tube. It is believed that the plastic tube expands upon being cooled to more snugly engage the metal tube because of its so-called "plastic memory," that is, the tendency of plastic materials to return to their original condition following a heating and cooling cycle. It will be noted that no fluid pressure or other expansion procedure or mechanism is required for expanding the tube. This obviously simplifies the procedure and, also, minimizes the likelihood of breaking or stressing of the plastic tube. The plastic tube is thus united with the metal tube to form a unitary, composite tube product.

The plastic tube is in radial compression so that it will tend to remain in tight engagement with the metal tube over a wide range of operating conditions, particularly temperature. For example, if the composite tube product were to be used under cool conditions, which over a period of time might tend to shrink the plastic tube away from the metal tube before the plastic tube can so shrink, first the radial compression will be relieved without substantial dimensional change of the plastic tube and, thus, there will be a tight engagement between the two tubes over a greater temperature range than would be the case if the plastic tube were not in compression. Moreover, such radial compression will make it possible to accommodate any tendency of the plastic tube to shrink due to aging so that a tight engagement will be maintained for a long period of time.

If desired, the inner surface of the metal tube can be roughened to enhance the holding of the plastic tube thereby but ordinarily such a procedure is not needed.

The preparation of a composite tube product will now be described with reference to the accompanying drawings, in which.

Figure 1:
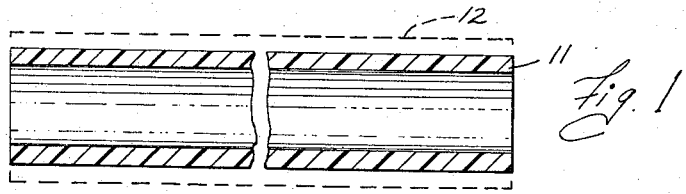
FIGURE 1 is a longitudinal sectional view through a length of plastic tubing, the original diameter of the plastic tube being shown in broken lines and the shrunken condition of the tube being shown in solid lines.
Figure 2:
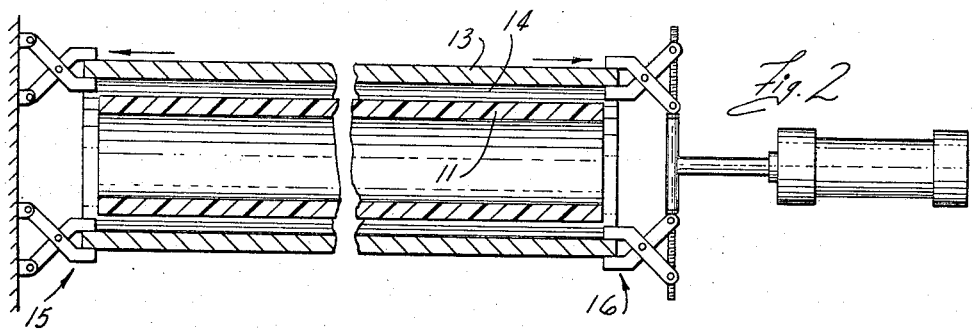
FIGURE 2 is a view similar to FIGURE 1 and showing the condition of the parts after the shrunken plastic tube has been inserted into the metal tube but before reduction of the diameter of the metal tube and schematically showing the stretching apparatus.
Figure 3:
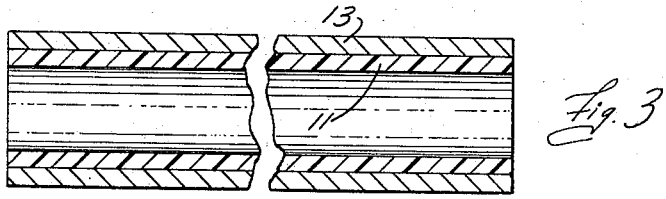
FIGURE 3 is a similar view showing the composite tube product in its assembled condition.
Figure 4:
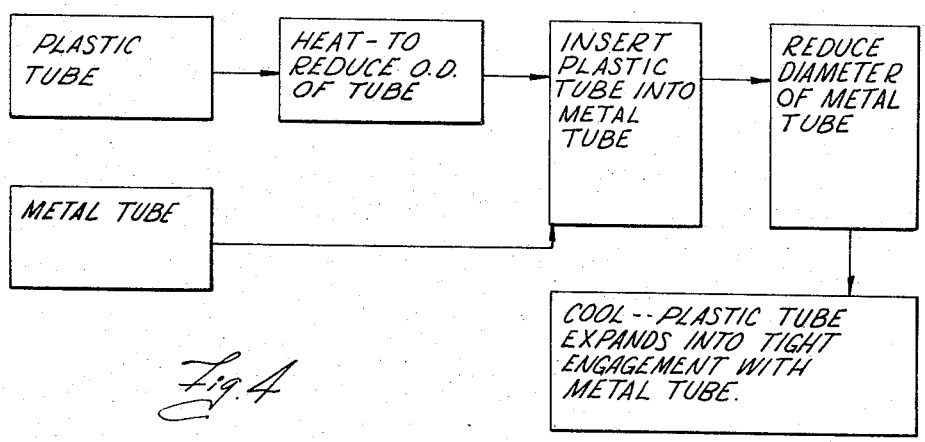
FIGURE 4 is a block diagram of the procedures involved in assembling the composite tube product.

Referring to FIGURE 1, a tube 11 of a suitable plastic material having the characteristics referred to above, here an extruded, substantially rigid polyvinyl chloride tube, having an initial outside diameter indicated by broken lines at 12, is heated to a suitable temperature, such as between about 180–200° F., which causes the tube 11 to shrink to the size indicated by solid lines in FIGURE 1. The heated tube is then slid lengthwise inside of an aluminum tube 13 which is of larger internal diameter and which is here shown as being somewhat longer than the plastic tube 11. There is thus formed an annular space 14 between the tubes 11 and 13. The space 14 has been exaggerated in FIGURE 2 for purposes of clarity. Where the plastic tube is made of substantially rigid polyvinyl chloride and the metal tube 13 is made of aluminum and the tubes have the sizes referred to above, the radial width of the annular space 14 should not exceed about 0.008 inch.

The diameter of the tube 13 is reduced in this example by gripping one end of the tube by fixed jaws 15 and gripping the other end of the metal tube by longitudinally movable jaws 16. The jaws 16 are moved away from the fixed jaws 15 to thereby stretch the metal tube and reduce its diameter so that its internal wall snugly engages the external wall of the plastic tube. Where aluminum tubing is being stretched, the stretching operation is carried out so as to reduce the diameter of the aluminum tubing by an amount not in excess of 0.020 inch and in any event to an extent less than that which would cause fracture of the aluminum tubing.

When the assembly of the plastic tube 11 and the metal tube 13 is cooled, the plastic tube will expand so that its external wall is in tight gripping engagement with the internal wall of the metal tube. Such expansion will eliminate any substantial gaps or pockets between the two tubes and said tubes will be secured together so tightly that the plastic tube cannot be moved lengthwise within the metal tube.

While the invention has been described in detail above, it will be understood that the invention contemplates such changes or modifications as lie within the scope of the appended claims.

The embodiments of the invention in which an exclusive property or privilege is claimed are defined as follows:

1. A method of forming a composite tubular product comprising an inner plastic tube and an outer metal tube, which comprises the steps of:

heating an elongated plastic tube to reduce the external diameter thereof;

placing the heated plastic tube inside of a metal tube which is of such an internal diameter that the heated plastic tube fits somewhat loosely therewithin;

deforming the metal tube to reduce the inside diameter of the metal tube while the plastic tube is still heated so that the internal wall of said metal tube mates with the external wall of said plastic tube; and cooling the assembly to permit the plastic tube to expand so that its external wall tightly engages the internal wall of said metal tube.

2. A method of forming a composite tubular product comprising an inner plastic tube and an outer metal tube, which comprises the steps of:

heating an elongated plastic tube having the characteristics of an extruded rigid polyvinyl chloride tube to reduce the external diameter thereof;

placing the heated plastic tube inside of the metal tube which is of such an internal diameter that the heated plastic tube fits somewhat loosely therewithin;

stretching the metal tube to reduce the diameter thereof so that the internal wall of said metal tube mates with the external wall of said plastic tube;

and then cooling the assembly to permit the plastic tube to expand so that its external wall tightly engages the internal wall of said metal tube.

3. A method of forming a composite tubular product comprising a polyvinyl chloride tube and an outer metal tube, which comprises the steps of:

heating a polyvinyl chloride tube to a temperature of between about 180° F. and 200° F. so that the external diameter of the tube is reduced and the tube is in a self-sustaining condition;

placing the heated polyvinyl chloride tube inside of a metal tube which is of such an internal diameter that an annular space of small radial thickness is formed between the two tubes;

stretching the metal tube to reduce the inside diameter of the metal tube so that the internal wall of said metal tube closely mates with the external wall of the plastic tube;

and then cooling the assembly to permit the polyvinyl chloride tube to expand so that its internal wall tightly engages the internal wall of said metal tube.

4. A method according to claim 3, in which the metal tube is composed of aluminum and in which the internal diameter of the aluminum tube, before stretching thereof, is not more than 0.020 inch larger in diameter than the external diameter of the heated polyvinyl chloride tube.

References Cited

UNITED STATES PATENTS

| 2,739,829 | 3/1956 | Pedlow | 29—447 X |
| 2,824,032 | 2/1958 | Rackleff | 264—230 X |
| 2,828,537 | 4/1958 | Pischke et al. | 29—517 |
| 2,986,847 | 6/1961 | Sato | 29—447 X |
| 2,989,785 | 6/1961 | Stahl | 264—230 X |
| 3,315,348 | 4/1967 | Donovan et al. | 29—516 X |
| 3,345,732 | 10/1967 | Brower | 29—447 X |

FOREIGN PATENTS 315,686    8/1956    Switzerland.

CHARLIE T. MOON, *Primary Examiner.*